Sept. 24, 1929.   C. F. KOCH   1,729,483
COUPLING FOR PIPES OR CONDUITS
Filed Jan. 15, 1927
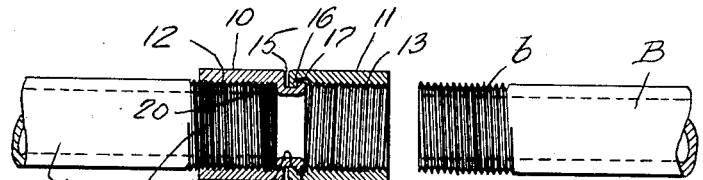
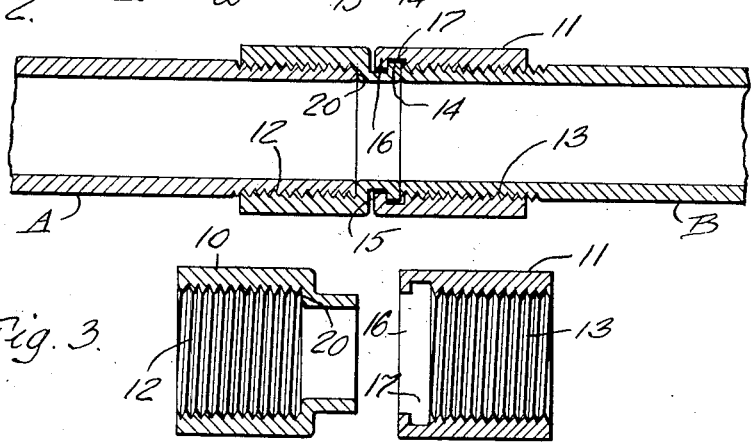
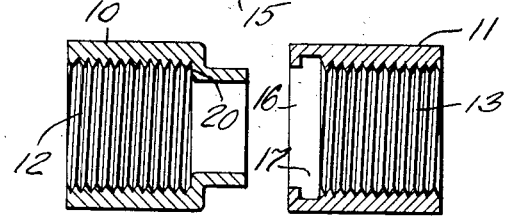
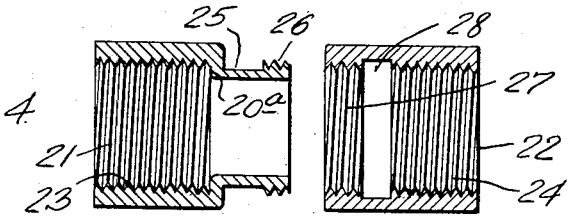
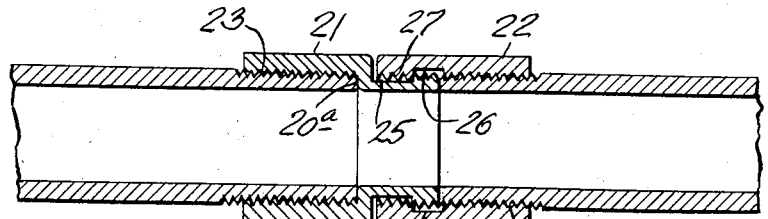
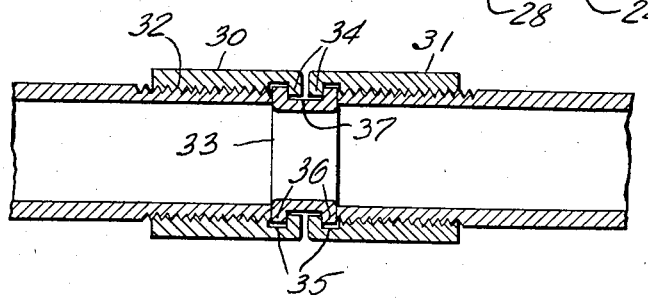
INVENTOR.
Charles F. Koch
by Parker & Prochnow
ATTORNEYS.

Patented Sept. 24, 1929

1,729,483

UNITED STATES PATENT OFFICE

CHARLES F. KOCH, OF BUFFALO, NEW YORK

COUPLING FOR PIPES OR CONDUITS

Application filed January 15, 1927. Serial No. 161,442.

This invention relates to improvements in couplings for pipes or conduits.

One of the present types of pipe or conduit coupling comprises an internally threaded sleeve or cylindrical member into the opposite ends of which the externally threaded ends of two pipes are screwed. This form of coupling is generally first screwed into place on the end of one of the pipes and then the other pipe is turned to engage its threaded end in the remaining portion of the coupling.

With couplings of this general character, it is often difficult, and sometimes impossible, to attach the coupling to pipes which are bent, as is frequently the case in electrical conduits, such as are used to enclose the usual insulated wires or conductors.

Couplings have, on the other hand, been proposed which are of such construction that the beforementioned objection could be overcome, but such couplings have been formed of a number of parts of more or less complicated construction, and are relatively expensive to produce.

The objects of the present invention are to provide a pipe or conduit coupling of relatively simple and inexpensive construction, and which is such that the coupling may be attached to the end of one pipe and then by engaging the end of the other pipe with the coupling, an attachment between the two pipes and the coupling may be secured by turning one member of the coupling relatively to the other, without the necessity of rotating either pipe; also to provide a coupling having two coupling members for attachment to the adjacent end of two pipes, and in which one of these members is swivelled to turn relatively to the other; also to provide a coupling having two axially alined annular coupling members having internally threaded bores for connection to two pipes or conduits, and a swivelled connection between said members which is such that the bore or inner face of the coupling will be substantially continuous with the bores of said conduits, so that wires or conductors may be freely passed through the connected conduits without injury by engagement with the transverse ends of the connected pipes; and also to improve and simplify the construction of couplings of this character in the other respects hereinafter set forth.

In the accompanying drawings,

Fig. 1 is a longitudinal section of one form of coupling embodying my improvements, showing the same secured on an end of one pipe and the corresponding portion of another pipe in position for attachment to the coupling.

Fig. 2 is a longitudinal section, on an enlarged scale, of the coupling shown in Fig. 1 showing the adjacent ends of two pipes connected thereto.

Fig. 3 is a sectional elevation showing the two members of the coupling as they appear before being connected together.

Fig. 4 is a longitudinal, sectional view of the two members of a modified form of coupling disconnected one from the other.

Fig. 5 is a similar view showing the coupling of Fig. 4 with the parts in connected relation to the end portions of two pipes.

Fig. 6 is a similar view of another modified form of coupling.

Pipe or conduit couplings embodying, in general, my improved construction may be formed in various ways. Three different constructions of my improved coupling are disclosed in the present drawings, by way of example.

In the form shown in Figs. 1 to 3, the pipe or conduit coupling comprises two annular or cylindrical coupling members 10 and 11, preferably arranged in axial alinement. The member 10 is provided with an internal, longitudinal threaded bore 12, while the member 11 is provided with a corresponding internally threaded bore 13. These members are loosely but permanently connected together so that either one may be turned or rotated on the other about their longitudinal axes to form a swivelled connection. This swivelled connection is formed by providing one of the members, such as the member 10, with an annular, outwardly extending shoulder 14 at one end thereof, and inwardly beyond and adjacent this shoulder there is an annular outwardly facing groove 15. The other member 11 is provided with a complementary portion including an inwardly directed, annular end shoulder 16 which loosely engages in the groove 15 of the member 10, and an internal, annular groove 17 within which the outwardly extending shoulder 14 of the member 10 loosely extends.

In order to secure together the ends of two pipes by means of the coupling above described, one of the pipes, for instance the pipe A, having its end threaded in the usual manner, as indicated at $a$, is first connected to one of the coupling members, for instance the member 10, by merely screwing this member on the pipe A. The threaded end $b$ of the second pipe B is then engaged in the open outer end of the other member 11, and then by turning this member relatively to the member 10, the pipe B will be drawn into and secured to the coupling. Preferably the member 10 is provided with an internal shoulder 20 which forms a stop for the end of the pipe A, while the end of the pipe B similarly abuts against the end of the shoulder 14 of the member 10. Thus the coupling members will be drawn away from each other until the adjacent faces of the shoulders 14 and 16 frictionally engage each other, thereby rigidly securing the coupling members and the two ends of the pipes together, and accidental disconnection of the coupling from the pipes is prevented.

The internal threads 12 and 13 of the two coupling members are both right hand threads, and by the construction described, the coupling may be attached by either of its members to one pipe or the other, as may be convenient. It will also be apparent that the coupling constructed as described, can be attached readily to bent pipes, as it is not necessary to turn or rotate the pipes to attach the coupling. In making this coupling, the outer end of the member 10 is first reduced as shown in Fig. 3, with that portion which forms the shoulder 14 extending longitudinally of the axis of the member, so as to permit the shouldered portion 16 of the member 11 to be slipped upon this reduced portion, after which the annular shoulder 14 is formed by turning the extreme end of the member 10 at substantially right angles, so that it extends into the groove 17 of the member 11 to form a permanent swivelled joint between these two members.

The modified form of coupling shown in Figs. 4 and 5 is also composed of two members which are swivelled to turn relatively to each other, as above described, but in this case the members can be detached one from the other. This coupling comprises the members 21, 22, formed respectively with the screw threaded bores 23 and 24 for the reception of the threaded ends of the pipes to which the coupling is to be attached. The member 21 is provided with an outwardly facing annular grove 25 corresponding to the groove 15 of the previous construction, while the outwardly extending, annular end shoulder of said construction is replaced by an outwardly directed threaded, annular shoulder 26. The adjacent end of the other member 22 is provided with an internally threaded portion 27 which is complementary to and is adapted to be screwed on the threaded portion 26 of the portion 21. This threaded portion 27 is of slightly less length than the longitudinal dimension of the groove 25 of the other member, and inwardly beyond this threaded portion 27, the member 22 is provided with an annular recess or groove 28 of slightly greater diameter than the diameter of said threaded portion, and which longitudinally, is of greater length than the threaded portion 26 of the other member. Consequently by connecting the externally threaded portion 26 of the member 21 with the internally threaded portion 27 of the member 22 and turning one or both members relatively to the other, the threaded portion 27 will pass beyond the threaded portion 26 and into register with the annular groove 25. At the same time said portion 26 will enter the recess 28, whereupon the threaded portions will be disengaged and the members will be permitted to turn freely or swivel one on the other, see Fig. 5.

In this construction also the member 21 is provided with the shoulder 20$^a$ corresponding to the shoulder 20, before described and against which the end face of a pipe can abut, while the corresponding end of the other pipe will abut against the end face of the threaded part 26, thus drawing the two members of the coupling away from each other until the adjacent faces of the shoulder 26 and groove 28 frictionally engage, whereby the coupling will be rigidly and securely attached to the ends of the two pipes and danger of accidental disengagement of the coupling from the pipes is prevented.

In both of the described constructions the pipe or conduit coupling consists of only two relatively simple, substantially cylindrical members which are connected or swivelled together in such a manner that the coupling may be readily attached to or disconnected from the ends of two pipes without the necessity of turning either pipe.

In the construction disclosed in Fig. 6, the coupling is formed of three parts, namely, two coupling members 30 and 31 which are substantially alike, and are each provided with an internally threaded bore 32, and a third connecting member or spool 33 on which the members 30 and 31 are swivelled, so as to turn relatively thereto or to one another.

The members 30 and 31 are both substantially similar to the member 11 of the first construction, that is, each is provided with an inwardly extending, annular end shoulder 34, and an inner annular groove 35 adjacent said shoulder. The spool 33 is in the form of a sleeve or cylindrical member provided at its opposite ends with outwardly directed opposite shoulders or flanges 36, complementary to and adapted to fit loosely within the grooves 35 of the members 30 and 31. By forming these outwardly directed flanges 36, there is provided between them an annular recess or groove 37 in which is received the shoulders 34 of both coupling members, the parts being so proportioned that there is some clearance between the adjacent end faces of these members when the parts are assembled. Consequently, by first attaching one of the coupling members to the threaded end of one of the pipes until this end engages the corresponding end of the spool or sleeve 33, then securing the other coupling member 31 on the end of the other pipe until the end face of this pipe engages the other end of the spool 33, the coupling will be securely attached to the two pipes, as before outlined.

While the modified construction just described is formed of three parts, the coupling nevertheless is also relatively simple and inexpensive to make, and all of the various constructions described have the same advantages in common, namely that either member of either coupling may be first attached to one pipe and then the other member afterwards attached to the other pipe by movement of this member relatively to the other and without turning either of the pipes. Furthermore, the couplings described are all so formed that the passage formed by the two pipes and the coupling is substantially continuous and unobstructed, so that wires can be easily passed therethrough.

I claim as my invention:

1. In a coupling for pipes and conduits, the combination of two axially alined coupling members, each having an internally threaded longitudinal bore for the reception of the threaded end of a pipe, at least one of said members having an end projecting beyond said threaded portion and which is formed with a rigid annular longitudinal wall, a rigid annular shoulder projecting inwardly therefrom, said shoulder forming in the side wall an annular inwardly facing groove disposed inwardly beyond said shoulder, and a connection between said coupling members which is connected with the other coupling member and which comprises an annular longitudinal portion extending between and forming an abutment for said ends of said pipes, and the inner diameter of which is substantially the same as that of said pipes so as to form a continuous bore with the inner walls of the latter, and said longitudinal portion having formed thereon an outwardly directed shoulder which extends within said groove of the first member and is surrounded and protected by said rigid annular wall of the latter, said connection also having an outwardly facing annular groove surrounding said longitudinal portion and into which said shoulder on said first member extends, whereby said coupling members are permanently connected together to swivel one on the other for attachment to said pipes without turning the latter, and whereby said inerfitting shoulders are protected against deformation in use.

2. In a coupling for pipes and conduits, the combination of two axially alined coupling members, each having an internally threaded longitudinal bore for the reception of the threaded end of a pipe, at least one of said members having an end projecting beyond said threaded portion and which is formed with an annular inwardly extending groove terminating at the outer edges thereof with an inwardly extending annular shoulder, a connection between said coupling members which is connected with said other coupling member and which comprises an annular, reduced longitudinal portion extending between and forming an abutment for and concealing the ends of said pipes, and the inner diameter of which is substantially the same as that of said pipes so as to form a continuous bore with the inner walls of the latter, whereby wires or cables passing through said connected pipes or conduits are prevented from coming into engagement with the transverse end walls of said pipes, and said longitudinal portion of said connection having formed thereon an annular part extending within said annular shoulder of said first coupling member and which has its end forced outwardly into the annular groove of said first coupling member to form a swivel connection therewith, whereby said coupling members are permanently connected together to swivel one on the other for attachment to pipes without turning the pipes, and whereby the interfitting shoulders are protected against deformation while in use.

CHARLES F. KOCH.